Jan. 6, 1959 S. E. SCHROEDER 2,867,132
SINGLE LEVER THROTTLE AND SHIFT CONTROL
Filed March 5, 1957 4 Sheets-Sheet 4

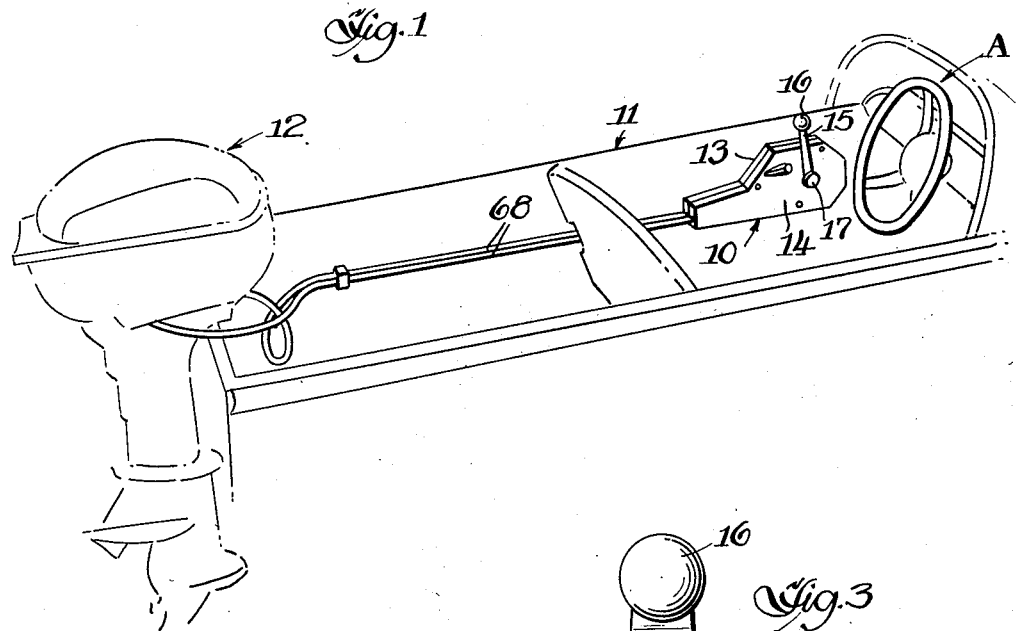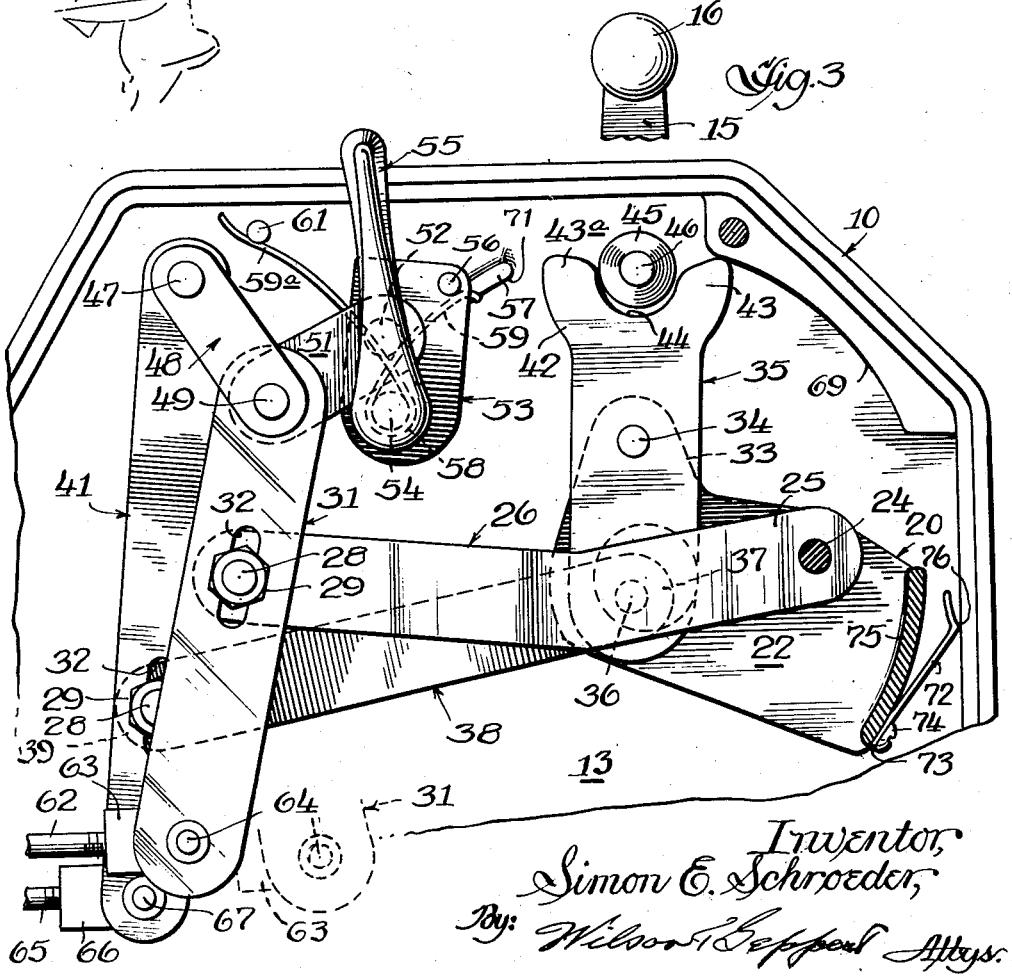

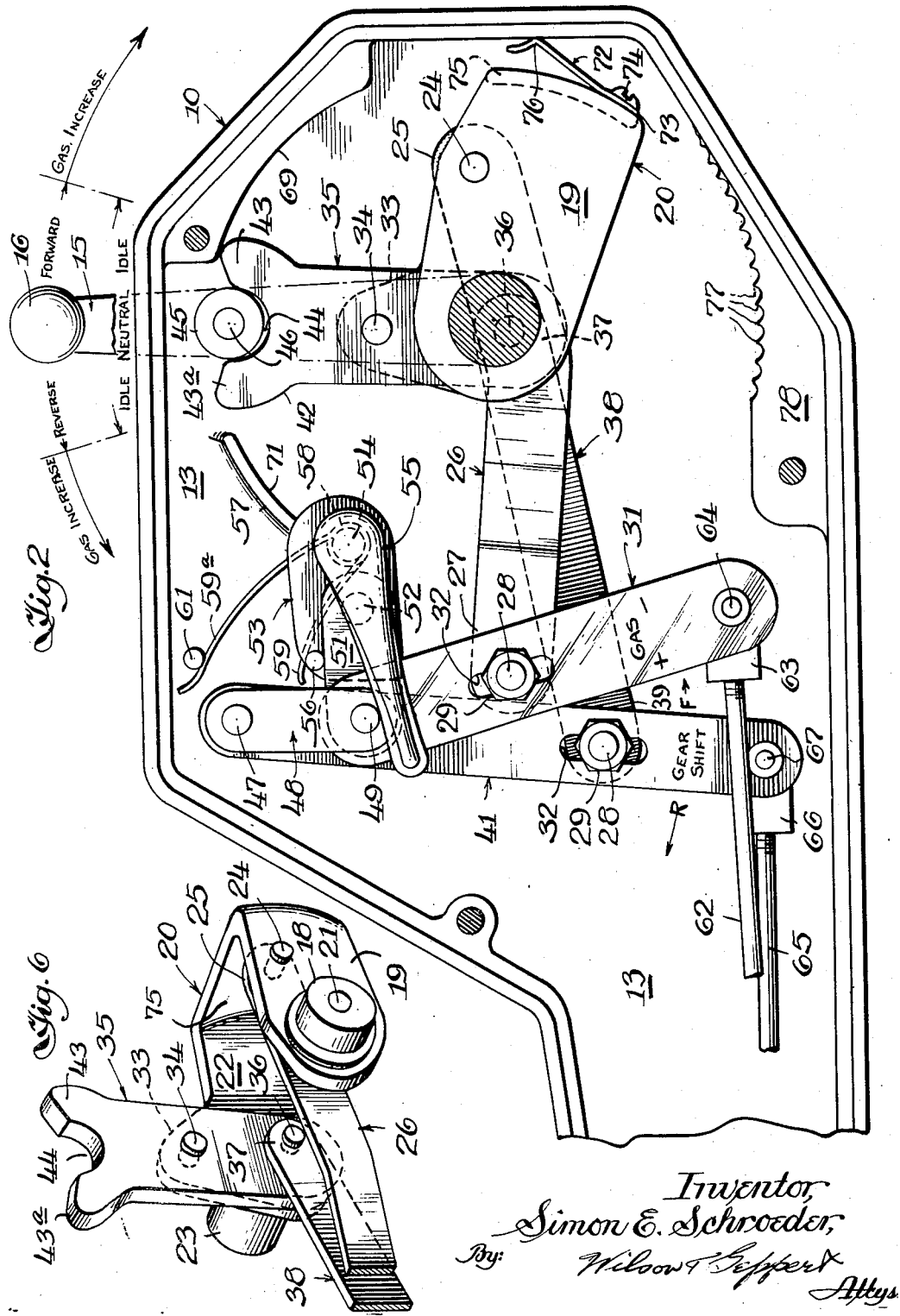

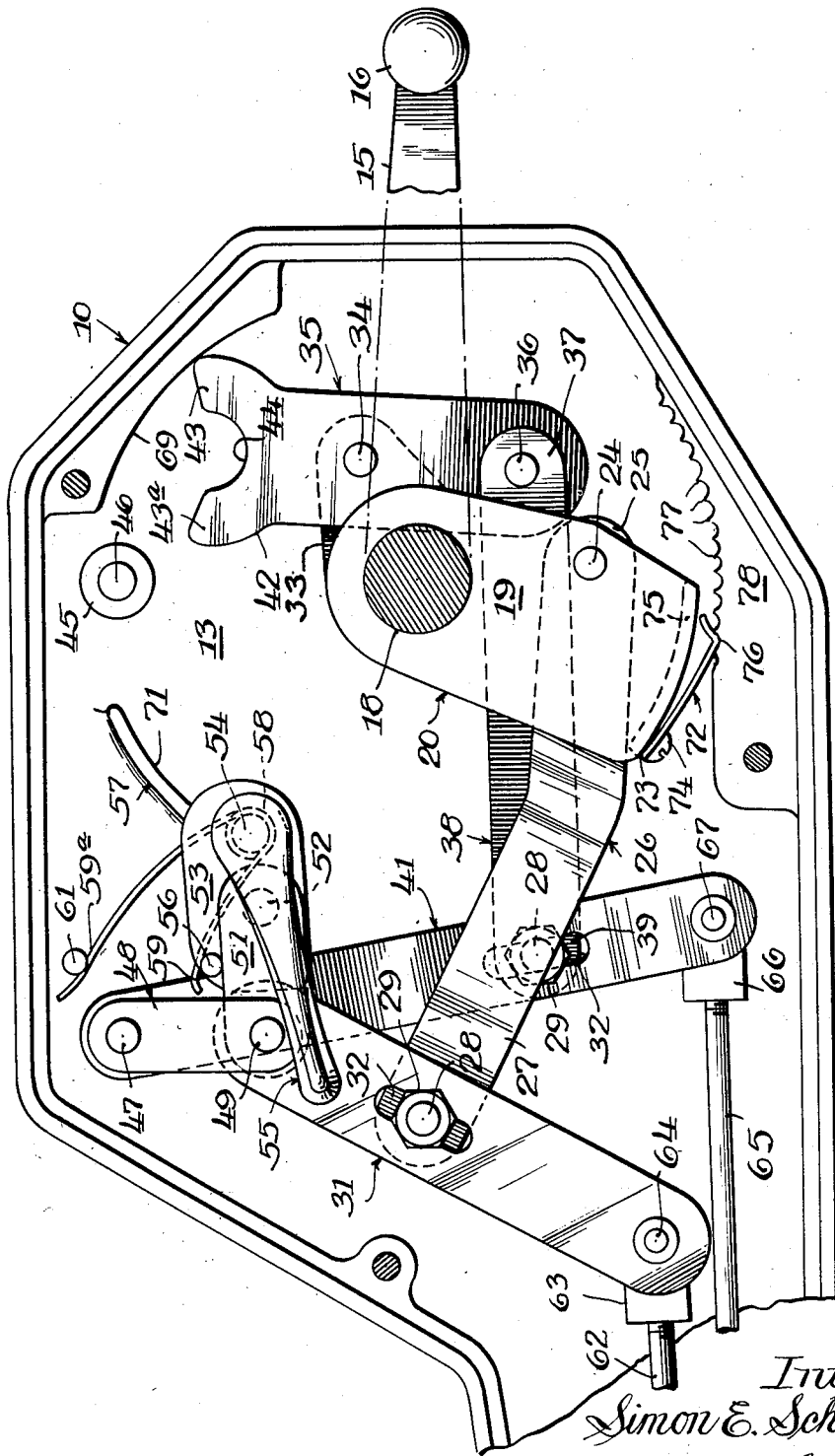

Inventor,
Simon E. Schroeder,
By: Wilson & Geppert Attys.

United States Patent Office 2,867,132
Patented Jan. 6, 1959

2,867,132

SINGLE LEVER THROTTLE AND SHIFT CONTROL

Simon E. Schroeder, Oshkosh, Wis., assignor, by mesne assignments, to Fox River Manufacturing Company, Oshkosh, Wis., a corporation of Wisconsin Application March 5, 1957, Serial No. 643,986

14 Claims. (Cl. 74—472)

The present invention relates to control mechanism for motor boats and more particularly to a novel remote control for an outboard motor, whereby the operator may readily and positively control the clutching or shifting of the gears from neutral to forward or reverse positions and synchronously and positively control the operation of the throttle and speed of operation by means of a single lever and from a position remote from the motor.

It is an important object of the present invention to provide a novel single lever remote control mechanism for controlling both the shifting of the clutch or gears and the throttle of a motor whereby the throttle remains at idling speed until shifting or clutching has been effected either from neutral to forward or from neutral to reverse position and thus avoid racing of the engine during the period of shifting with possible damage to the operating mechanism of the motor and loss of control by the operator.

The present invention further comprehends a novel single lever throttle and shift for controlling the clutching and declutching of the gears and synchronously controlling the throttle and in which when shifting the gears from forward or reverse and back to neutral initial movement of the lever actuates the throttle to idling position before the clutch or gears are shifted to neutral position. This provides for a smooth and positive control of shifting and throttling and which is effected with utmost ease and coordination.

The present invention further comprehends a novel single lever control for controlling both the transmission or forward and reverse gearing and the engine speed whereby reversing or motor-idling is effected without effort and without danger of the operator losing control or shifting at high throttle speed.

Another object of the present invention is the provision of a novel single lever throttle and shift control for an outboard motor boat in which there is provided a simplified assembly of camming means and linkage for positively controlling both the throttle and the shifting of the gears.

A further object of the present invention is the provision of a novel throttle and gear shift control mechanism for controlling in predetermined sequence the throttle and shifting of the gears for forward or reverse operation.

A further object of the present invention is the provision in combination with the novel single lever control of a novel auxiliary throttle control for use when starting the motor. With the novel single lever throttle and shift control in neutral position for starting, the auxiliary throttle control is shifted from a preset idling position to a partially open position to facilitate starting. Then as the throttle and shift control lever is shifted to forward or reverse position, the auxiliary throttle control is returned to and retained in its preset idling position.

Further objects are to provide a construction of maximum simplicity, efficiency, economy and ease of assembly and operation, and such further objects, advantages and capabilities as will later more fully appear and are inherently possessed thereby.

In the drawings:

Figure 1 is a fragmentary perspective view of an outboard motor boat embodying my novel single lever control for operation of the gear shift and throttle of the motor, and showing an auxiliary throttle control for opening the throttle a predetermined amount when starting the motor, the single lever remote control and the auxiliary lever being shown in neutral and inoperative position.

Fig. 2 is a fragmentary enlarged view in side elevation of the novel remote control mechanism in the position the parts occupy when in neutral or inoperative position as in Fig. 1, the cover plate of the housing having been removed to show the arrangement and location of the component parts of the assembly.

Fig. 3 is a fragmentary view in side elevation of the operating mechanism of Fig. 2 with the single control lever disposed in neutral position but with the auxiliary throttle control elevated from its normal inoperative position to thereby open the throttle a predetermined or desired amount when starting the motor.

Fig. 4 is a view similar to Fig. 2 but showing the single lever for controlling the throttle and shift in the position it and its controlled mechanism occupy when moved to the position for operating the boat in a forward direction.

Fig. 6 is a fragmentary view in perspective of the yoke and associated linkage of the throttle and shift control mechanism whose operation is actuated and controlled by the single lever.

Figure 5:
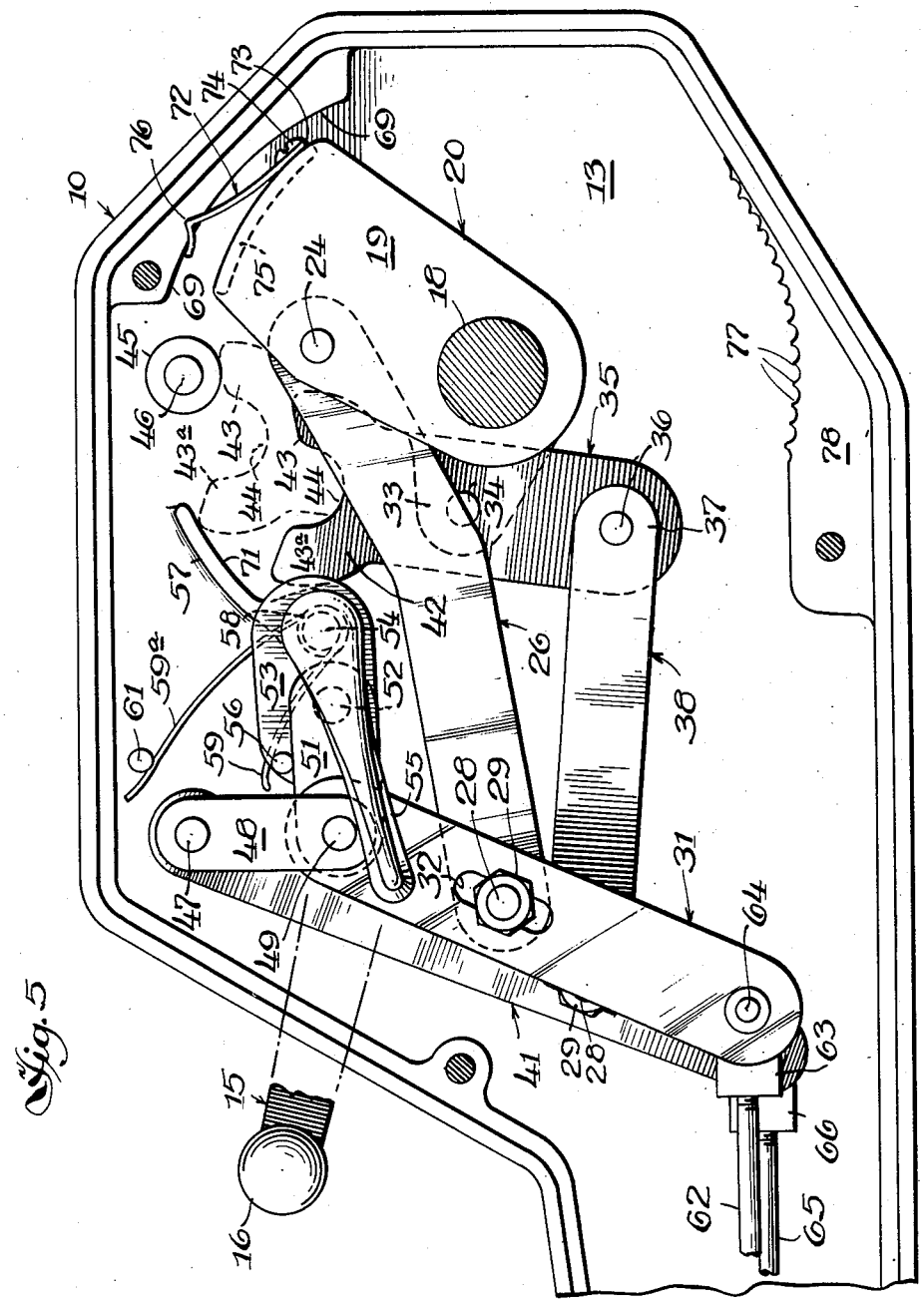
Fig. 5 is a view similar to Fig. 4 but showing the single control lever moved to the position it and its controlled mechanism occupy when the lever is moved to the left or rearwardly for reversing the motor.

Referring to the disclosure in the drawings and to the novel embodiment selected to illustrate the present invention, the throttle and shift control mechanism is shown in Fig. 1 as enclosed within a housing or casing 10 mounted at a convenient location at one side of the boat 11 and forward and remote from the motor 12 (Fig. 1). This housing may be supported in any suitable manner but in close proximity to the steering control or wheel A and includes a base 13 suitably secured to the boat and a cover 14 detachably mounted upon the base for easy removal and access to the mechanism within the housing.

Upon the exterior of the cover is rotatably mounted a single lever 15 having an operating handle 16 for remotely and positively controlling the mechanism within the housing for both shifting and throttling and in a novel manner in which reversing or motor idling is without danger of the operator losing control or shifting at high throttle speed. By reason of the positive coordination of both shifting and throttling, the operator cannot shift at high throttle speed and is assured of effortless control at all times.

The lever 15 is provided with a collar 17 mounted upon and secured to a hub 18 attached to and projecting from a leg 19 of a substantially U-shaped member or yoke 20 by means of a connecting pin 21 (Fig. 6). The hub 18 projects through and is rotatably mounted in the cover 14 of the housing. The other leg 22 of the yoke 20 is spaced rearwardly of the leg 19 and provided with a hub 23 which is rotatably mounted or journalled in the base 13 of the housing 10, whereby the yoke 20 is free to be rotated by movement of the single lever 15.

The leg 19 carries an eccentric pin 24 upon the inner end of which is journalled or pivotally connected one end 25 of a link 26 for manipulating the throttle. The other end 27 of this link is adjustably connected by means of a bolt 28 and nut 29 to a depending arm or link 31 intermediate the ends of the latter. To permit such adjustment, the depending arm or link 31 for the throttle is provided with an elongated and longitudinally extending slot 32 through which the bolt 28 projects and when in adjusted position the connecting bolt is in the slot, and the nut 29 maintains the connection between the links 26 and 31.

The other spaced leg 22 of the yoke 20 is provided with a projection or lug 33 carrying a pin 34 upon which is pivotally mounted a gear shift or clutch lever 35 intermediate its ends. This member 35 in turn carries a pin 36 adjacent its lower end to which is pivotally connected one end 37 of a link 38 for initiating shifting of the gears, the other end 39 of this link being adjustably connected by a bolt 28 and nut 29 to an intermediate position on a depending arm or link 41. Like the link 31, the link 41 is provided intermediate its length with an elongated slot 32 to permit adjustment of the link 38.

The gear shift or clutch lever 35 has its upper end 42 bifurcated to provide spaced legs or bifurcations 43 and 43ᵃ with a cam slot 44 therebetween adapted to conformably receive therebetween a roller 45 carried by a fixed pin 46 mounted in the base 13 of the housing 10.

The upper end of the depending bar or link 41 for the gear shift is pivotally mounted adjacent its upper end upon a pin or pivot 47 and upon which pin or pivot is also pivotally mounted the upper end of a toggle link 48. The lower end of the toggle link 48 is pivotally connected to the upper end of the depending link 31 for the throttle control by means of a connecting pin or pivot 49. To this pin or pivot 49 is also connected one end of a toggle link 51, the other end of this toggle link being pivotally connected at 52 to a plate or link 53, the latter being pivotally mounted upon a pin or pivot 54 in the base 13 of the housing 10.

Also mounted on the pin or pivot 54 is one end of an auxiliary throttle control handle 55. This control handle is shown in Figs. 1, 2 and 4 in its lowered, inoperative position and in Fig. 3 in its elevated, operative position. Its function is to open the throttle a predetermined or desired amount when starting the motor. To limit the throw of this auxiliary control handle 55 and its plate or link 53 which are connected and move as a unit, the plate 53 is provided with an offset pin 56 adapted to abut an upstanding rib or embossment 57 on the base 13 when moved to its elevated position, and to engage the link 51 in its lowered position. A spring 58 is coiled about the pin or pivot 54 with one end 59 engaging the pin 56 and the other end 59ᵃ engaging a pin 61 on the base 13.

The auxiliary control handle 55 being spring-loaded and connected through the links 53, 51, 31 and 26 to the yoke 20, it is returned to its lowered, inoperative position (Figs. 2, 4 and 5) upon the initial movement by the operator of the lever 15 from neutral toward forward or reverse position after starting the motor. As shown in Fig. 3, the handle 55 has been manually elevated for starting and carries along therewith the plate 53 which in turn moves the toggle links 51 and 48 to the position shown. This in turn moves the depending throttle arm or link 31 about its then pivot (bolt 28) with the lower end moved from the dotted line position to its full line position (Fig. 3) to partially open the throttle. Thereafter, initial movement of the lever 15 from neutral causes the connected toggle linkage to return along with the handle 55 to inoperative or idling position shown in Figs. 2, 4 and 5 before shifting of the gears is accomplished.

The depending throttle control link 31 is connected at its lower end to one end of a push-pull rod 62 and connector 63 by means of a pin 64 carried by the lower end of the link 31, while the lower end of the depending gear shift link 41 is connected to one end of a push-pull rod 65 and connector 66 by means of a pin 67 carried by the lower end of this link 41. Connected to the outer end of each push-pull rod is one end of a flexible cable 68 (Fig. 1) with the other end of these cables connected to the gear shift and to the throttle of the motor.

In the operation of the novel throttle and shift control mechanism, the auxiliary throttle control handle 55 is moved to the position shown in Fig. 3. After starting has been accomplished, the single lever 15 for actuating the throttle and shift control mechanism is then moved from its neutral or upright position forwardly or to the right as shown in Fig. 4 for forward travel, or rearwardly or to the left as shown in Fig. 5 for reverse travel. In the movement of the control lever 15 to either forward or reverse position, component parts of the control mechanism are so related and their movement so synchronized that the auxiliary throttle control linkage and handle 55 are moved from the position shown in Fig. 3 back to the idling position of Fig. 2, after which the forward or reverse gear is engaged or clutched and only then the throttle can be opened for propelling the boat in the desired direction and at the desired speed. Thus the operator is prevented from shifting at high throttle speed with the inherent danger of losing control and possible injury and damage to the control mechanism and boat.

As the single control lever 15 is moved to either forward position (Fig. 4) or to reverse position (Fig. 5), the yoke or U-shaped bracket 20 is rotated by movement of the lever to the position shown in these views. As shown in Figs. 2 and 3, with the yoke 20 in neutral position, the gear shift lever 35 is disposed in upright or substantially vertical position with the roller 45 disposed within the cam slot 44. Moving the single control lever forwardly for shifting to forward motion, causes the upper end 42 of the gear shift lever 35 to be withdrawn from the roller 45 and moved downwardly and forwardly with the forward leg or bifurcation 43 moved along a camming surface or curved abutment 69 in the base 13 of the housing 10.

In Fig. 5 is disclosed in dotted lines the manner in which the upper end 42 of the gear shift or clutch lever 35 is withdrawn from the roller 45 and then moved rearwardly and downwardly with its leg 43ᵃ engaging and guided by a cam surface 71 on the rib or embossment 57 in the base 13 of the housing 10.

In this movement from the neutral position of Figs. 2 and 3 to the forward position of Fig. 4, or to the rearward or reverse position of Fig. 5, the initial arc of movement of the yoke 20 is such that it first returns the throttle from starting to idling position after which movement of the link 26 and the throttle control is not effected until the link 38 is moved forwardly (Fig. 4) or rearwardly (Fig. 5) a sufficient distance to shift the gears for the desired direction of travel. Upon shifting of the gears, the throttle control including the link 26 and the depending arm or link 31 are thereupon moved to open the throttle. In Figs. 4 and 5, the throttle control is shown moved to fully open position, but the lever 15 may be moved from neutral to any intermediate position depending upon the desired speed of travel.

To maintain the gears engaged at the desired speed of forward travel, the present invention comprehends the provision of a leaf spring 72 anchored at one end 73 by a screw 74 to the base or connecting web 75 of the yoke 20 and with its other or free end provided with a detent or catch 76 adapted to engage a tooth 77 in a serrated part or insert 78 affixed to or formed in the base 13 of the housing 10. While the detent means may also function for reverse operation, it is generally not required.

Having thus disclosed the invention, I claim:

1. In combination with the motor of a motor boat having a transmission adapted to be shifted from neutral into forward and reverse and a throttle controlling the fuel supply and speed of the motor, an auxiliary throttle control for use when starting the motor, control mechanism mounted in the boat remote from said motor and connected to the motor for controlling the transmission and the throttle, said remote control mechanism including a housing, a single lever throttle and shift control pivotally mounted on said housing, a yoke having spaced parallel legs journalled in the housing for swinging movement and rotatable by said control lever, a gear shift member pivotally mounted intermediate its ends upon one leg of said yoke, means for connecting one end of said gear shift member to said throttle, the other end of said member being bifurcated to provide spaced projections and a cam slot therebetween, a roller mounted upon a fixed pivot in the housing and adapted to be received in the cam slot when the single lever and the yoke are disposed in neutral position and to control the movement of said gear shift member as the latter is moved by rotation of said yoke, and means for connecting the other leg of said yoke to said throttle.

2. Remote control mechanism for the motor of a motor boat having a throttle controlling the fuel supply and a transmission adapted to be shifted from neutral into forward and reverse, a housing mounted at a remote location in the boat, control mechanism mounted in said housing and connected to the motor and including a single lever throttle and shift control for controlling in sequence the throttle and the transmission, and means actuated by movement of said lever from neutral to shift said transmission into forward or reverse before opening the throttle to increase the speed of the motor, said means including a yoke eccentrically mounted in said housing and having spaced legs one of which is connected to said lever for rotating said yoke upon rotation of said lever, a throttle control member connected to and actuated by one of said legs, a gear shift member pivotally mounted intermediate its ends to the other leg of said yoke and having one end connected to the transmission, spaced bifurcations on the other end of said gear shift member, a member mounted on a fixed axis in said housing and adapted to be received in the space between said bifurcations when said single lever, yoke and gear shift member are disposed in neutral position, and a connection from said yoke to actuate the throttle.

3. Remote control mechanism as set forth in claim 2, in which movement of said single lever to forward or reverse position from neutral rotates said yoke and moves said gear shift member to shift the transmission to forward or reverse and thereafter open the throttle.

4. Remote control mechanism as set forth in claim 2, in which movement of said single lever to forward or reverse position from neutral rotates said yoke and moves said gear shift member to shift the transmission to forward or reverse and thereafter open the throttle, and when the single lever is moved from forward or reverse position back to neutral, the throttle is first moved to idling position after which shifting of the gears is effected and whereby shifting at high throttle speeds is prevented.

5. In combination with the motor of a motor boat having shifting mechanism adapted to be shifted from neutral into forward and reverse and a throttle controlling the fuel supply and speed of the motor, control mechanism in the boat and connected to the motor for controlling the throttle and the shifting mechanism from a position remote from the motor, said remote control mechanism including a housing mounted at a readily accessible location in the boat, a single lever throttle and shift control pivotally mounted on said housing, said lever being movable from neutral position to shift to forward or reverse, first mechanical means for connecting said lever to said throttle, second mechanical means actuated by movement of said lever from neutral to forward or reverse to first shift into forward or reverse before said first mechanical means opens the throttle whereby the motor speed is increased only after shifting to forward or reverse has been accomplished, and when the lever is shifted from forward or reverse to neutral, the throttle is first moved to idling position by said first mechanical means to reduce the speed of the motor before shifting is accomplished by said second mechanical means, and a spring-biased auxiliary control associated with said first mechanical means for partially opening the throttle when starting the motor and when released is spring-biased to inoperative position.

6. In combination with the motor of a motor boat having a transmission adapted to be shifted from neutral into forward and reverse and a throttle controlling the fuel supply and speed of the motor, control mechanism mounted in the boat remote from and connected to the motor for controlling both the transmission and the throttle including a support, a single lever throttle and gear shift control pivotally mounted on said support, first mechanical means connecting said lever to the transmission of the motor, second mechanical means also connecting the lever to the throttle, said first mechanical means being actuated by movement of said lever from neutral to first shift said transmission into forward or reverse before said second mechanical means opens the throttle to increase the speed of the motor, and when the lever is shifted back to neutral the throttle is first moved to idling position by said second mechanical means after which the transmission is disengaged, and an auxiliary control connected to said second mechanical means for partially opening the throttle when the motor is started but rendered inoperative by said second mechanical means upon moving said lever from neutral to forward or reverse.

7. Remote control mechanism for the motor and propeller of a motor boat with the motor provided with a gear shift and a throttle for controlling the fuel supply to the motor and the speed of the boat, comprising a support mounted in an accessible location in the boat, a single throttle and shift control lever pivotally mounted on the support for remotely controlling the gear shift and for synchronously controlling the throttle, a U-shaped member having one of its legs connected to the control lever and its spaced legs rotatably mounted in said support, a gear shift actuating member mounted between the legs of said U-shaped member and pivotally mounted on the other of said legs, a control rod connected to the gear shift on the motor and a control rod connected to the throttle on the motor, means for eccentrically connecting the gear shift control rod to said gear shift actuating member and means for eccentrically connecting the throttle control rod to the first mentioned leg of said U-shaped member whereby rotating said lever from neutral to forward or reverse first rotates said U-shaped member and the gear shift actuating memebr moves said gear shift control rod to shift the gears of the motor to forward or reverse and then said U-shaped member moves the throttle control rod to open the throttle.

8. Remote control mechanism for the motor and propeller of a motor boat with the motor provided with a gear shift and a throttle for controlling the fuel supply to the motor, comprising a housing mounted in an accessible location in the boat, a single lever throttle and shift control pivotally mounted on the housing for remotely controlling in sequence the gear shift and the throttle as the control lever is moved from neutral to forward or reverse, a U-shaped member having its spaced legs pivotally mounted in said housing and connected to said lever for rotating said member, gear actuating means pivotally mounted upon one leg of said member, means for eccentrically connecting the gear shift to said gear actuating means, means for eccentrically connecting the throttle to the other leg of said member, whereby rotating said lever from neutral to forward or reverse after said motor has been started, rotates said member to move said gear shift actuating means to shift to forward or reverse and in sequence moves the throttle control to open the throttle, and when said lever is returned from forward or reverse to neutral said lever first moves the throttle control connection to move the throttle to idling and then moves the gear shift to shift the gears to neutral, thereby preventing shifting at high throttle speed.

9. The combination set forth in claim 8, including an auxiliary handle connected to the throttle control for partially opening the throttle when starting the motor with the control lever in neutral position, and means for moving said auxiliary handle to inoperative position upon movement of said single lever from neutral position.

10. Remote control mechanism as set forth in claim 7, including an auxiliary throttle control movable from inoperative to operative position in which it partially opens the throttle when starting the motor with the single lever in neutral position and means for moving said auxiliary throttle control to inoperative position when the single lever is moved from neutral position.

11. Remote control mechanism for the motor and propeller of a motor boat with the motor provided with a gear shift and a throttle for controlling the fuel supply to the motor and the speed of the boat, comprising a support mounted in an accessible location in the boat, a single lever throttle and gear shift control for remotely controlling the gear shift by movement from neutral to forward or reverse and for synchronously controlling the throttle, said lever being pivotally mounted upon the support, a U-shaped member pivotally mounted in the support and rotated by movement of said lever from neutral to forward or reverse, a gear shift lever pivotally mounted intermediate its ends upon a leg of said U-shaped member and provided at one end with bifurcations and a cam slot therebetween, a roller mounted in said support and adapted to be received in said slot when the single lever is in neutral position, a gear shift link connected at one end to the other end of said gear shift lever, a gear shift arm pivotally mounted at one end in said support and connected intermediate its length to said link, a control rod connected at one end to the gear shift and at the other end to said gear shift arm, a throttle link connected at one end to said member, a throttle arm pivotally mounted at one end in the support and connected intermediate its length to said throttle link, a control rod connected to the throttle and at its other end to said throttle arm whereby rotation of the lever from neutral to forward or reverse first causes said member to be rotated to move the bifurcated end of the gear shift lever whereby to disengage said bifurcated end from the roller and to shift the gears after which further rotation of said member in the same direction moves the throttle control rod to open the throttle.

12. Remote control mechanism as set forth in claim 10, including an auxiliary throttle control connected to said throttle arm for partially opening the throttle when starting the motor with the single lever in neutral position and means for returning said auxiliary throttle control to inoperative position when the motor is started and said lever is operated.

13. Remote control mechanism for the motor and propeller of a motor boat with said motor having gearing for operating the propeller in forward or reverse and a throttle for controlling the fuel supplied to the motor, comprising a supporting housing, a single lever throttle and shift control pivotally mounted on said housing and movable from neutral position to forward or reverse operating position, a U-shaped yoke having its spaced legs pivotally mounted in said housing with one leg of said yoke connected to said lever, a gear shift member pivotally mounted intermediate its ends upon the other leg of said yoke, said gear shift member having one end bifurcated with a slot therebetween, an abutment mounted in the housing and received in said slot when the single lever is in neutral position and when the single lever is shifted from neutral to forward or reverse position said yoke and gear shift member are rotated whereby the bifurcated end of the gear shift member is disengaged from said abutment, a link connected at one end to the other end of the gear shift member, a gear control rod connected to the other end of said link, a throttle link eccentrically connected at one end to one leg of said yoke, and a throttle control rod connected to the other end of said throttle link, said gear shift member when moved away from said abutment by movement of said single lever and yoke from its neutral position to either forward or reverse, shifting the gearing for forward or reverse operation of the motor, after which said single lever continues to rotate said yoke to shift the throttle control to open the throttle.

14. Remote control mechanism for the motor of a motor boat with the motor provided with a gear shift and a throttle for controlling the fuel supply to the motor and the speed of the boat, comprising a housing mounted in an accessible location in the boat, a throttle and shift control mechanism mounted in said housing and a single lever for remotely controlling in sequence the gear shift and the throttle as the single lever is moved from neutral to forward or reverse, an eccentric member connected to and rotated by said lever and provided with spaced legs pivotally mounted in said support, a gear shift actuating member pivotally mounted on said eccentric member, means for connecting said actuating member to the gear shift on the motor, means for connecting said eccentric member to the throttle on the motor, said means for connecting the gear shift actuating member to said gear shift and said means for connecting said eccentric member to the throttle connection being so related that as said single lever is moved from neutral to forward or reverse, said gear shift actuating member first actuates the gear shift after which said eccentric member opens the throttle.

References Cited in the file of this patent

UNITED STATES PATENTS 2,444,324    Allen et al. _____ June 29, 1948